(12) United States Patent
Park

(10) Patent No.: US 11,506,543 B2
(45) Date of Patent: Nov. 22, 2022

(54) TEMPERATURE SENSOR INSTALLING DEVICE AND METHOD FOR POWER RELAY ASSEMBLY

(71) Applicant: HYUNDAI MOBIS Co., Ltd., Seoul (KR)

(72) Inventor: Jin Soo Park, Gwangmyeong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/381,607

(22) Filed: Jul. 21, 2021

(65) Prior Publication Data

US 2022/0026282 A1 Jan. 27, 2022

(30) Foreign Application Priority Data

Jul. 21, 2020 (KR) .................... 10-2020-0090553

(51) Int. Cl.
| | |
|---|---|
| G01K 1/14 | (2021.01) |
| G01K 1/143 | (2021.01) |
| H01H 9/02 | (2006.01) |
| H01H 11/00 | (2006.01) |
| H02G 5/02 | (2006.01) |

(52) U.S. Cl.
CPC ............ *G01K 1/143* (2013.01); *H01H 9/02* (2013.01); *H01H 11/00* (2013.01); *H02G 5/02* (2013.01)

(58) Field of Classification Search
CPC .......... G01K 1/143; H01H 9/02; H01H 11/00; H02G 5/02
USPC .......................................... 200/293
See application file for complete search history.

(56) References Cited

U.S. PATENT DOCUMENTS

| 5,176,451 A * | 1/1993 | Sasada .................... F24C 3/126 374/165 |
| 2006/0165153 A1* | 7/2006 | Tillman ................... G01K 1/16 374/185 |

FOREIGN PATENT DOCUMENTS

WO WO 2019/169894 A1 9/2019

* cited by examiner

*Primary Examiner* — Edwin A. Leon
*Assistant Examiner* — Iman Malakooti
(74) *Attorney, Agent, or Firm* — NSIP Law

(57) ABSTRACT

A temperature sensor installing device for a power relay assembly is configured to be attached to a lower surface of a bus bar attached to a heating surface of the power relay assembly. The temperature sensor installing device includes: a body housing; a temperature sensor insertion recess formed in an upper portion of the body housing and accommodating a temperature sensor such that a temperature sensing surface of the temperature sensor faces upward; and a nut insertion recess formed in the upper portion of the body housing and accommodating a nut.

14 Claims, 5 Drawing Sheets

TEMPERATURE SENSOR INSTALLING DEVICE AND METHOD FOR POWER RELAY ASSEMBLY

CROSS-REFERENCE TO RELATED APPLICATIONS

This application claims the benefit under 35 U.S.C. § 119(a) of Korean Patent Application No. 10-2020-0090553 filed on Jul. 21, 2020 in the Korean Intellectual Property Office, the entire disclosure of which is incorporated herein by reference for all purposes.

BACKGROUND

1. Field of the Invention

The present invention relates to a power relay assembly (PRA) that is used as a power supply for a battery system which serves to store and supply energy for an electric motored vehicle, and more particularly, to a device and a method for installing a temperature sensor in a PRA.

2. Discussion of Related Art

A power relay assembly (PRA), which is used as a power supply for a battery system which serves to store and supply energy for an electric motored vehicle, is a key component in the battery system and an element essentially requiring thermal management. In the battery system, the most amount of heat is generated in the PRA (in particular, in a relay contact part). To measure such a temperature, a thermistor sensor is attached onto a bus bar. A battery management unit (BMU) receives information about the measured temperature and performs a function of cutting off battery power.

FIG. 1 illustrates the conventional method of sensing a temperature by coupling a temperature sensor to a bus bar, like in a cantilever structure. A bus bar 20 is first coupled to a heating surface 10 of the PRA using a bus bar coupling bolt 30, and next a temperature sensor mounting ring 50 included in the temperature sensor 40 is loaded on the bus bar 20 and then coupled to the bus bar 20 using a temperature sensor mounting bolt 35. A nut (not shown) is attached to a corresponding position of the bus bar 20 through a clinching method to couple the temperature sensor mounting bolt 35 to the bus bar 20.

However, the conventional method inherently has the following problems.

First, the temperature sensor basically measures a temperature on a sensing surface 45 of its bottom, but since in the PRA the heat is actually generated at positions other than a position corresponding the sensing surface 45, a response rate in temperature measurement is decreased, and the measured value is read lower than actual temperature.

Second, since, in order to couple the temperature sensor mounting ring 50 which is necessary for mounting the temperature sensor to the bus bar 20, the pressure for tightening the temperature sensor mounting bolt 35 is to be applied; due to a reaction to the pressure, the temperature sensing surface 45 may be lifted up from a surface of the bus bar 20 (see an arrow in FIG. 1). As a result, reliability and response rate of a measured value are lowered, and quality control of a product becomes quite difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a temperature sensor installing device for a power relay assembly, which is configured to be attached to a lower surface of a bus bar attached to a heating surface of the power relay assembly, includes: a body housing; a temperature sensor insertion recess formed in an upper portion of the body housing and accommodating a temperature sensor such that a temperature sensing surface of the temperature sensor faces upward; and a nut insertion recess formed in the upper portion of the body housing and accommodating a nut.

The nut may be inserted into the nut insertion recess of the body housing through any one of a press fitting, an insert molding, and a bonding.

At least a portion of the body housing may be formed as a hollow chambered structure.

A depth of the temperature sensor insertion recess of the body housing may be less than a height of the temperature sensor such that, when the temperature sensor is disposed in the temperature sensor insertion recess, the temperature sensing surface of the temperature sensor protrudes upward from a level of an upper surface of the body housing.

A depth of the nut insertion recess of the body housing may be less than a height of the nut such that, when the nut is disposed in the nut insertion recess, a surface of the nut protrudes upward from a level of an upper surface of the body housing.

In another general aspect, a method for installing a temperature sensor on a heating surface of a power relay assembly includes: attaching a bus bar to the heating surface of the power relay assembly; bringing a temperature sensing surface of the temperature sensor into contact with a lower surface of the bus bar; and fixedly coupling the temperature sensor, with the temperature sensing surface being in contact with the lower surface of the bus bar, to the bus bar using a bolt.

The bringing of the temperature sensing surface of the temperature sensor into contact with the lower surface of the bus bar and the fixedly coupling of the temperature sensor to the bus bar using the bolt may be performed by a temperature sensor installing device including: a body housing; a temperature sensor insertion recess formed in an upper portion of the body housing and accommodating the temperature sensor such that the temperature sensing surface faces upward; and a nut insertion recess formed in the upper portion of the body housing and accommodating a nut.

The nut may be inserted into the nut insertion recess through any one of a press fitting method, an insert method, and a bonding method.

At least a portion of the body housing may be formed as a hollow chambered structure.

In another general aspect, a power relay assembly in which a temperature sensor is installed includes: a bus bar attached to a heating surface of the power relay assembly; a temperature sensor installing device attached to a lower surface of the bus bar; and a temperature sensor disposed in the temperature sensor installing device and in contact with the lower surface of the bus bar. The temperature sensor is disposed in the temperature sensor installing device such that a temperature sensing surface of the temperature sensor faces upward. The bus bar is attached to the heating surface of the power relay assembly by a temperature sensor mounting bolt coupled to a nut of the temperature sensor installing device.

The temperature sensor installing device may include: a body housing; a temperature sensor insertion recess formed in an upper portion of the body housing and accommodating the temperature sensor such that the temperature sensing surface faces upward; and a nut insertion recess formed in the upper portion of the body housing, and accommodating the nut.

The nut may be inserted into the nut insertion recess of the body housing through any one of a press fitting, an insert molding, and a bonding.

At least a portion of the body housing of the temperature sensor installing device may be formed as a hollow chambered structure.

A shape of a lower end of the nut may correspond to a shape of the nut insertion recess.

The nut insertion recess and a lower end of the nut may each have a tetragonal shape.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

The advantages and features of the present invention and methods for accomplishing the same will be more clearly understood from embodiments to be described in detail below with reference to the accompanying drawing. However, the present invention is not limited to the following embodiments but may be implemented in various different forms. Rather, these embodiments are provided only to complete the disclosure of the present invention and to allow those skilled in the art to understand the category of the present invention. The present invention is defined by the category of the claims.

In addition, terms used in this specification are to describe the embodiments and are not intended to limit the present invention. As used herein, singular expressions, unless defined otherwise in context, include plural expressions. It will be further understood that the terms "comprises," "comprising," "includes," and/or "including," when used herein, specify the presence of stated elements, steps, operations, and/or components but do not preclude the presence or addition of one or more other elements, steps, operations, and/or components.

Hereinafter, exemplary embodiments of the present invention will be described in detail with reference to the accompanying drawings. Moreover, in describing the embodiments, detailed descriptions related to well-known functions or configurations will be ruled out in order to not unnecessarily obscure subject matter of the present invention.

Figure 1:
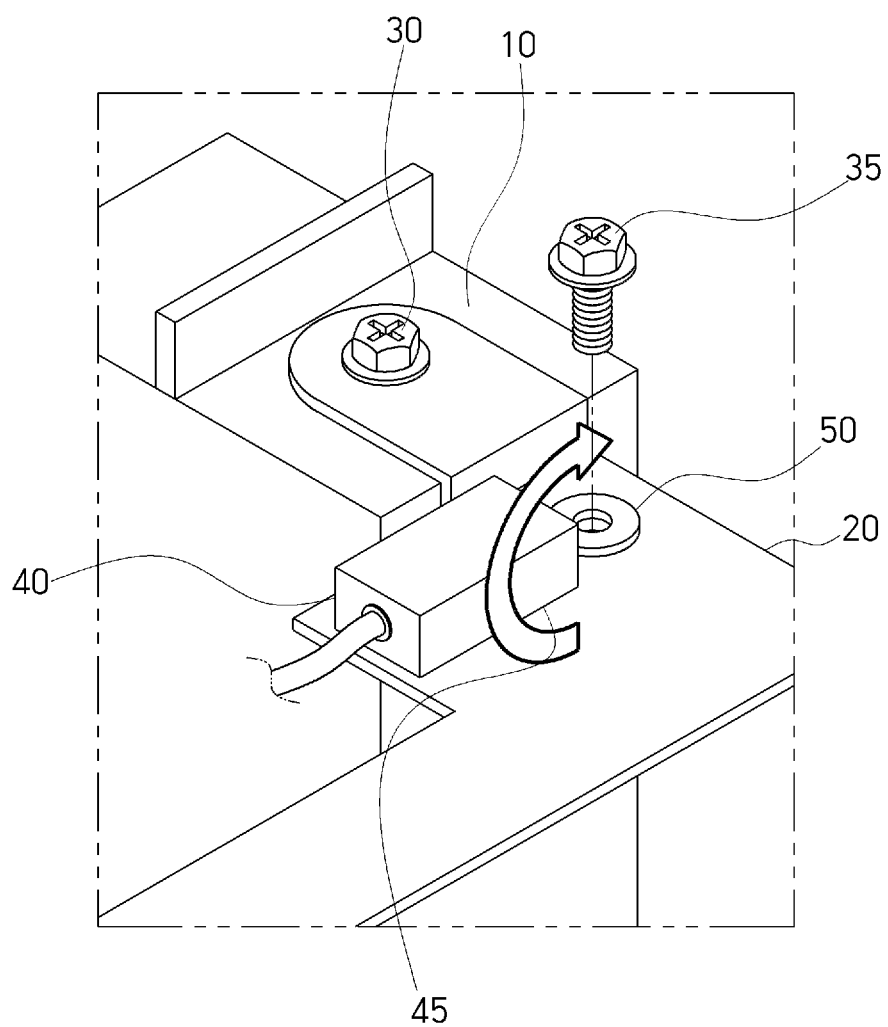
FIG. 1 is a view of a structure for mounting a conventional temperature sensor.
Figure 2:
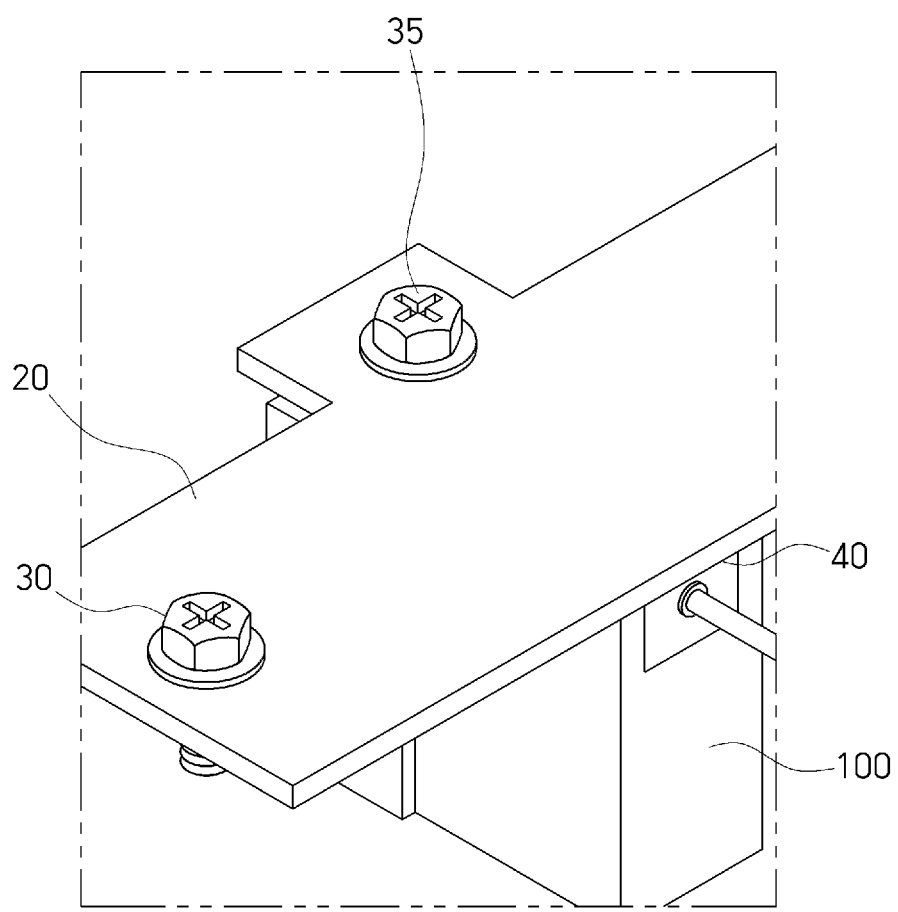
FIG. 2 is a conceptual view of the present invention.

FIG. 2 is a conceptual view of the present invention and illustrates a state in which a temperature sensor 40 is mounted on a lower surface of a bus bar 20 using a temperature sensor installing device 100 for a power relay assembly (PRA).

The temperature sensor installing device 100 in which the temperature sensor 40 is inserted is mounted on the lower surface of the bus bar 20, which is coupled to the PRA with a bus bar coupling bolt 30, using a temperature sensor mounting bolt 35. A nut (to be described below), to which the temperature sensor mounting bolt 35 is coupled, is inserted into the temperature sensor installing device 100 through an insert mold method, unlike the related art, and so the nut does not need to be clinched into the bus bar 20.

Figure 3:
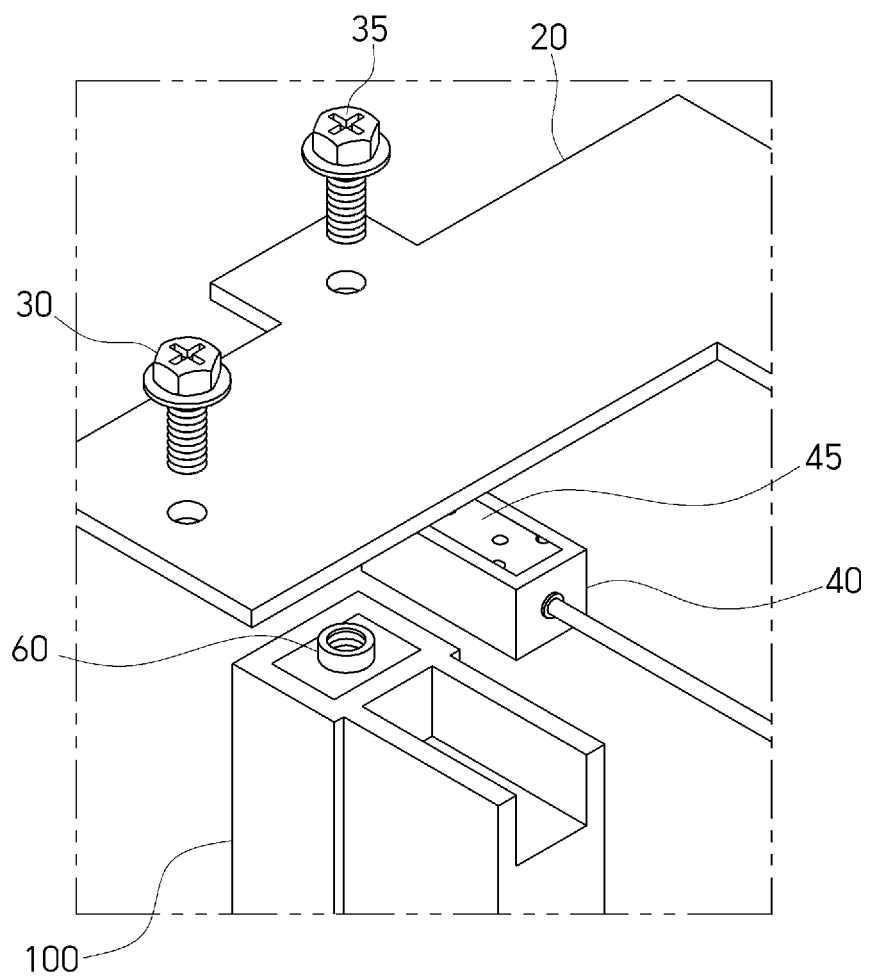
FIG. 3 is a view of a state before a temperature sensor installing device (100) of FIG. 2 is installed on a bus bar.

FIG. 3 is a view of a state before the temperature sensor installing device 100 is installed on the bus bar 20 and a view for describing a relationship between the temperature sensor 40 and the temperature sensor installing device 100 mounted beneath the bus bar 20.

The temperature sensor 40 is inserted into a space formed in an upper portion of a body housing of the temperature sensor installing device 100 such that a sensing surface 45 thereof faces upward. The temperature sensor installing device 100 is placed on the lower surface of the bus bar 20, and the temperature sensor mounting bolt 35 is coupled to a nut 60 disposed on the body housing.

Figure 4:
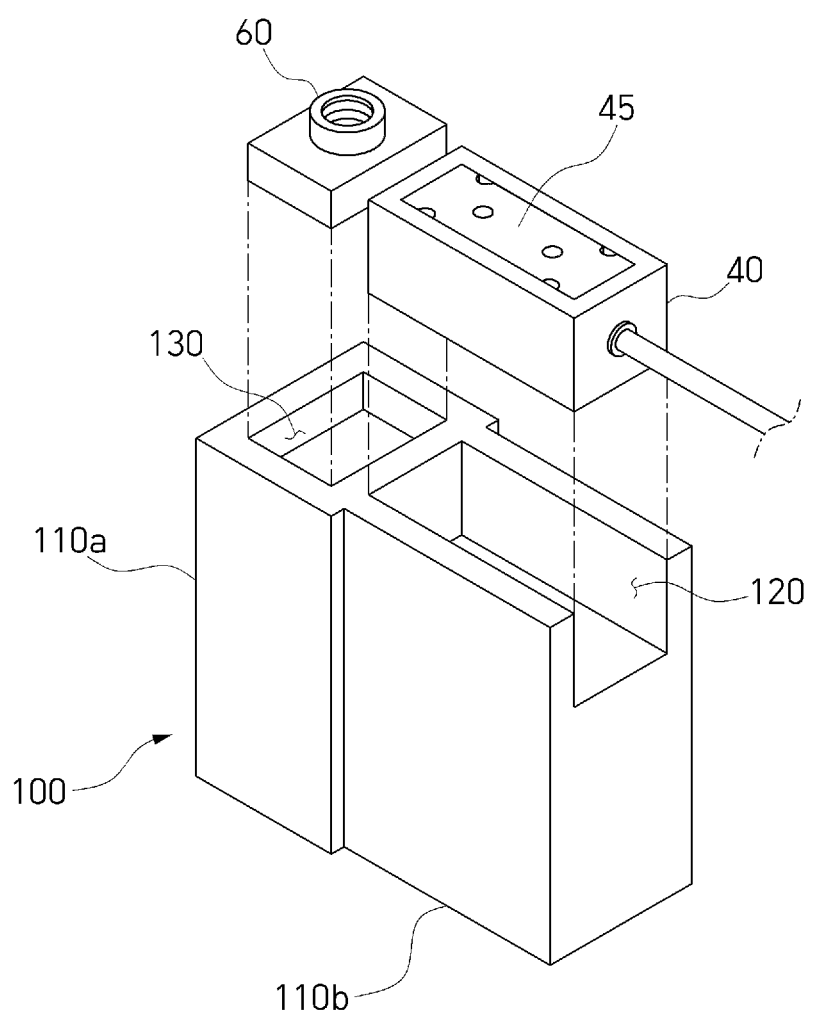
FIG. 4 is an exploded view of a temperature sensor installing device (100) according to an embodiment implementing a concept shown in FIGS. 2 and 3.
Figure 5:
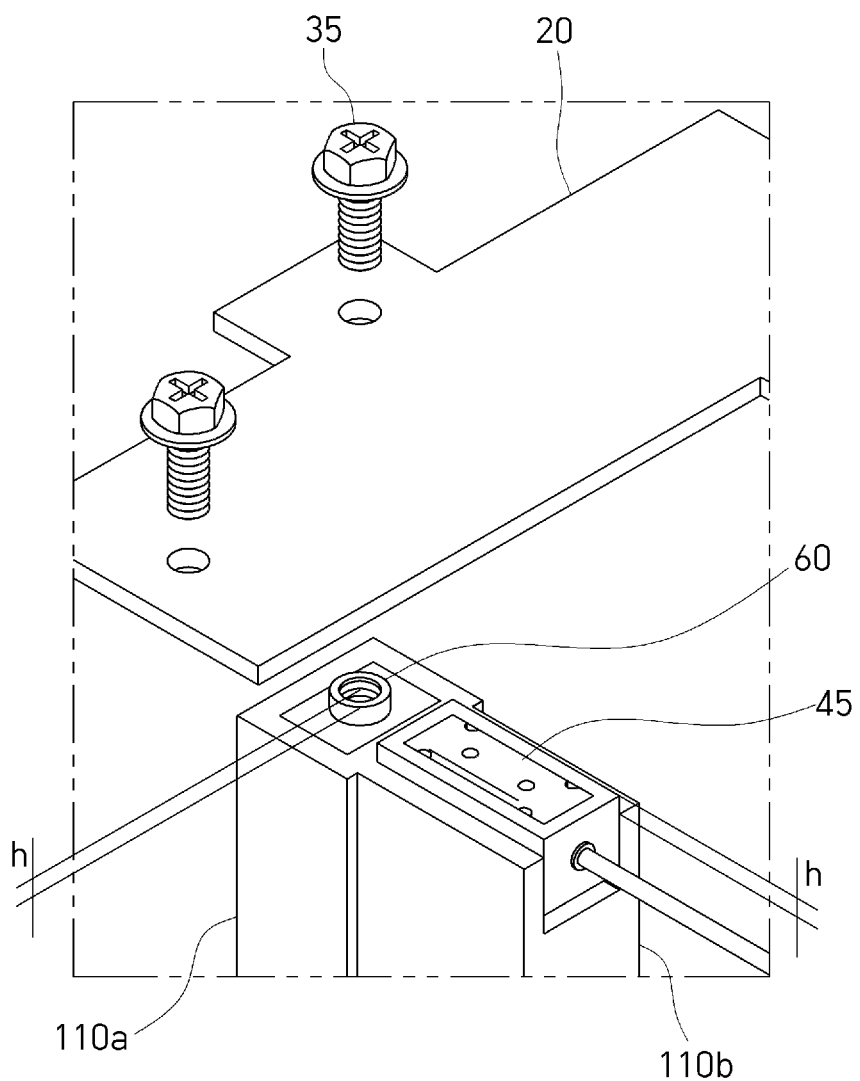
FIG. 5 illustrates a state in which the temperature sensor installing device (100) is mounted on a bus bar (20).

FIG. 4 is an exploded view of a temperature sensor installing device 100 according to an embodiment implementing a concept shown in FIGS. 2 and 3. FIG. 5 illustrates a state in which a temperature sensor is assembled to the temperature sensor installing device 100 and then mounted on a bus bar 20 using a temperature sensor mounting bolt 35.

In FIG. 4, the temperature sensor installing device 100 includes body housing 110a and 110b having an approximately rectangular shape. Although the temperature sensor installing device 100 includes a wider body housing portion 110a and a narrower body housing portion 110b, the present invention is not limited thereto, and of course, an entire body of the temperature sensor installing device 100 may be formed as one integral body housing.

A temperature sensor insertion recess 120 is formed in an upper portion of the body housing 110b in an intaglio shape corresponding to a shape of a temperature sensor 40. The temperature sensor 40 is inserted into the temperature sensor insertion recess 120 in an inverted state such that a temperature sensing surface 45 thereof faces upward.

A nut insertion recess 130 in which a nut 60 is placed (inserted or buried) is formed in an upper portion of the other body housing portion 110a. Here, the nut 60 is hardware coupled to the temperature sensor mounting bolt 35. FIG. 4 illustrates that the nut insertion recess 130 has a tetragonal shape and a lower end of the nut 60 also has a tetragonal shape corresponding thereto.

As a method of attaching the nut 60 to the nut insertion recess 130, a method such as a press fitting, bonding, insert molding, insert injection, etc. may be used. As an example, after the body housing 110a, 110b is formed to produce the temperature sensor installing device 100, the nut 60 may be press-fitted into or bonded to the nut insertion recess 130. For another example, in a process of forming the body housing 110a, 110b, the nut 60 may be integrally formed through a method such as an insert molding or insert injection method.

The entirety portions of or at least a portion of the body housing 110a and 110b is formed as a hollow chambered structure. As a result, it is possible to minimize the heat transfer to the body housing from a heat generating portion of a PRA (a portion of which a temperature is to be measured with the temperature sensor), thereby accurately transferring heat generated from the PRA to the temperature sensor.

A state in which the temperature sensor 40 is assembled to the temperature sensor installing device 100 having the structure as shown in FIG. 4 and then mounted beneath the bus bar 20 using the temperature sensor mounting bolt 35 will be described with reference to FIG. 5.

The temperature sensor installing device 100, in which the nut 60 is inserted into the body housing portion 110a and the temperature sensor 40 is inserted into the temperature sensor insertion recess 120 of the body housing portion 110b such that the sensing surface 45 thereof faces upward, is placed on a lower surface of the bus bar 20, and the temperature sensor mounting bolt 35 is coupled to the nut 60 from above to install the temperature sensor 40. Due to such a temperature sensor installation structure, an exposed area of the temperature sensor other than the bus bar is minimized. The nut 60 to which the temperature sensor mounting bolt 35 is coupled can be press-fitted, bonded, or inserted into the body housing 110a, and thus an effect can be expected of reducing costs as compared with a conventional method of attaching the nut 60 to the bus bar 20 using a clinching method.

In order to increase the adhesion between the sensing surface 45 of the temperature sensor 40 and the lower surface of the bus bar 20, a depth of the temperature sensor insertion recess 120 is made smaller than a height of the temperature sensor 40, and thus, the sensing surface 45 is designed to protrude upward by a height h from an upper surface height of the body housing 110b after the temperature sensor 40 is inserted. Accordingly, the nut 60 is also inserted so as to protrude upward by approximately the height h from an upper surface height of the body housing 110a. The amount of height h is an arbitrary value, but according to one embodiment, the height h is about 2 mm.

According to the present invention, the following effects can be obtained.

1) Improvement in responsiveness of temperature measurement: because heat dissipation is minimized through a chambered body housing, the responsiveness of the temperature measurement is improved.

2) Improvement in reliability of temperature measurement: it is possible to improve the reliability of a measured temperature through a chamber structure and also to suppress the lifting of a sensor during installation and use of the sensor, thereby reducing a quality deviation and improving the reliability of measurement.

3) Improvement in structural stability: because there is no temperature sensor mounting ring, a rotation caused by torque is removed when a temperature sensor is mounted on a bus bar. In addition, a more stable fastening force is provided as compared with a nut clinched into the existing bus bar, and improved convenience is provided to a worker or operator.

4) Reduction in cost: according to the present invention, the nut clinching method is replaced with a nut inserting embedding to a body housing, and thus cost reduction can be expected.

The present invention has been described in detail with reference to the exemplary embodiments of the present invention, but those skilled in the art will understand that the present invention may be implemented in another specific form different from the content disclosed in this specification without changing the technical spirit or an essential feature of the present invention. Thus, it is to be appreciated that the embodiments described above are intended to be illustrative in every sense and not restrictive. The scope of the present invention is represented by the claims to be described below rather than the detailed description, and it is to be interpreted that the scope of the claims and all the changes or modified forms derived from the equivalents thereof are included in the scope of the present invention.

What is claimed is:

1. A temperature sensor installing device for a power relay assembly, which is configured to be attached to a lower surface of a bus bar attached to a heating surface of the power relay assembly, the temperature sensor installing device comprising:
   a body housing;
   a temperature sensor insertion recess formed in an upper portion of the body housing and accommodating a temperature sensor such that a temperature sensing surface of the temperature sensor faces upward; and
   a nut insertion recess formed in the upper portion of the body housing and accommodating a nut,
   wherein a depth of the temperature sensor insertion recess of the body housing is less than a height of the temperature sensor such that, when the temperature sensor is disposed in the temperature sensor insertion recess, the temperature sensing surface of the temperature sensor protrudes upward from a level of an upper surface of the body housing.

2. The temperature sensor installing device of claim 1, wherein the nut is inserted into the nut insertion recess of the body housing through any one of a press fitting, an insert molding, and a bonding.

3. The temperature sensor installing device of claim 1, wherein at least a portion of the body housing is formed as a hollow chambered structure.

4. The temperature sensor installing device of claim 1, wherein a depth of the nut insertion recess of the body housing is less than a height of the nut such that, when the nut is disposed in the nut insertion recess, a surface of the nut protrudes upward from a level of an upper surface of the body housing.

5. A method for installing a temperature sensor on a heating surface of a power relay assembly, the method comprising:
   attaching a bus bar to the heating surface of the power relay assembly;
   bringing a temperature sensing surface of the temperature sensor into contact with a lower surface of the bus bar using a temperature sensor installing device that defines a recess in which the temperature sensor is disposed, the temperature sensor being disposed in the recess such that the temperature sensing surface of the temperature sensor protrudes upward from an upper surface of the temperature sensor installing device; and
   fixedly coupling the temperature sensor, with the temperature sensing surface being in contact with the lower surface of the bus bar, to the bus bar using a bolt.

6. The method of claim 5, wherein the bringing of the temperature sensing surface of the temperature sensor into contact with the lower surface of the bus bar and the fixedly coupling of the temperature sensor to the bus bar using the bolt are performed by a temperature sensor installing device comprising:
   a body housing;

a temperature sensor insertion recess formed in an upper portion of the body housing and accommodating the temperature sensor such that the temperature sensing surface faces upward; and a nut insertion recess formed in the upper portion of the body housing and accommodating a nut.

7. The method of claim 6, wherein the nut is inserted into the nut insertion recess through any one of a press fitting method, an insert method, and a bonding method.

8. The method of claim 6, wherein at least a portion of the body housing is formed as a hollow chambered structure.

9. A power relay assembly in which a temperature sensor is installed, the power relay assembly comprising:
  a bus bar attached to a heating surface of the power relay assembly;
  a temperature sensor installing device attached to a lower surface of the bus bar; and
  a temperature sensor disposed in the temperature sensor installing device and in contact with the lower surface of the bus bar,
  wherein the temperature sensor is disposed in the temperature sensor installing device such that a temperature sensing surface of the temperature sensor faces upward and such that the temperature sensing surface of the temperature sensor protrudes upward from an upper surface of the temperature sensor installing device, and
  wherein the bus bar is attached to the heating surface of the power relay assembly by a temperature sensor mounting bolt coupled to a nut of the temperature sensor installing device.

10. The power relay assembly of claim 9, wherein the temperature sensor installing device includes:
  a body housing;
  a temperature sensor insertion recess formed in an upper portion of the body housing and accommodating the temperature sensor such that the temperature sensing surface faces upward; and
  a nut insertion recess formed in the upper portion of the body housing, and accommodating the nut.

11. The power relay assembly of claim 10, wherein the nut is inserted into the nut insertion recess of the body housing through any one of a press fitting, an insert molding, and a bonding.

12. The power relay assembly of claim 10, wherein at least a portion of the body housing of the temperature sensor installing device is formed as a hollow chambered structure.

13. The power relay assembly of claim 10, wherein a shape of a lower end of the nut corresponds to a shape of the nut insertion recess.

14. The power relay assembly of claim 10, wherein the nut insertion recess and a lower end of the nut each have a tetragonal shape.

* * * * *